United States Patent
Doersing et al.

(10) Patent No.: US 7,661,242 B2
(45) Date of Patent: Feb. 16, 2010

(54) HOLLOW STRUCTURAL COMPONENT MADE OF PLURAL CONNECTED PARTS

(75) Inventors: Hans Doersing, Delmenhorst (DE); Guenter Hoppe, Oyten (DE); Peter Sander, Bremen (DE)

(73) Assignee: Airbus Deutschland GmbH, Hamburg (DE)

( * ) Notice: Subject to any disclaimer, the term of this patent is extended or adjusted under 35 U.S.C. 154(b) by 884 days.

(21) Appl. No.: 10/910,259

(22) Filed: Aug. 2, 2004

(65) Prior Publication Data

US 2005/0029401 A1 Feb. 10, 2005

(30) Foreign Application Priority Data

Aug. 2, 2003 (DE) .................................. 103 35 483

(51) Int. Cl.
*E04B 2/00* (2006.01)
(52) U.S. Cl. ..................... 52/783.1; 52/654.1; 52/797.1; 52/796.12
(58) Field of Classification Search ................ 52/783.1, 52/731.2, 731.3, 731.4, 731.5, 731.6, 735.1, 52/737.6, 654.1, 797.1, 796.12; 244/123, 244/117 R, 123.14, 119, 123.1, 123.2, 123.4, 244/123.7, 123.8, 123.9
See application file for complete search history.

(56) References Cited

U.S. PATENT DOCUMENTS

| | | | | |
|---|---|---|---|---|
| 3,298,883 A | * | 1/1967 | Lemelson | ..................... 156/71 |
| 3,643,900 A | * | 2/1972 | Maloney | ..................... 244/123.1 |
| 3,694,990 A | * | 10/1972 | Pamer | ........................ 52/839 |
| 4,715,560 A | * | 12/1987 | Loyek | ..................... 244/117 R |
| 4,894,974 A | * | 1/1990 | Mayhew et al. | ............. 52/783.1 |
| 5,242,523 A | * | 9/1993 | Willden et al. | ............... 156/285 |
| 5,337,950 A | * | 8/1994 | Bower | ........................ 229/164 |
| 5,788,146 A | | 8/1998 | Bradford et al. | |
| 5,816,013 A | * | 10/1998 | Opferbeck et al. | ........ 52/745.19 |
| 5,849,393 A | * | 12/1998 | Slattery | ..................... 428/172 |
| 6,286,289 B1 | | 9/2001 | Powell et al. | |
| 6,364,250 B1 | * | 4/2002 | Brinck et al. | ................ 244/119 |
| 6,546,693 B2 | * | 4/2003 | Wycech | ..................... 52/790.1 |
| 6,561,388 B2 | * | 5/2003 | Michelson et al. | ........... 222/322 |
| 6,684,593 B2 | * | 2/2004 | Brenneis et al. | ............... 52/630 |
| 2005/0011152 A1 | * | 1/2005 | O'Grady et al. | ............... 52/364 |

FOREIGN PATENT DOCUMENTS

WO WO 95/18013 7/1995

* cited by examiner

*Primary Examiner*—Richard E Chilcot, Jr.
*Assistant Examiner*—Chi Q Nguyen
(74) *Attorney, Agent, or Firm*—W. F. Fasse; W. G. Fasse

(57) ABSTRACT

A hollow structural component suitable for an aircraft structure includes an inner framework of intersecting longitudinal and transverse ribs, cover sheets covering the top and bottom of the framework, and end closure sheets covering ends of the framework. The transverse ribs have slots to receive the intersecting longitudinal ribs and vice versa, so the ribs intermesh in a grid pattern. Top and bottom edges of the ribs have protruding connector tabs that are fitted into slots provided in the cover sheets. Additional connector tabs at the ends of the transverse ribs are fitted into slots in the end closure sheets. After the parts are assembled by intermeshing the longitudinal and transverse ribs and fitting the connector tabs of the ribs into the slots of the cover sheets and end closure sheets, the resulting plugged-in joints are permanently mechanically secured, e.g. by welding, brazing, soldering or adhesive bonding.

26 Claims, 2 Drawing Sheets

HOLLOW STRUCTURAL COMPONENT MADE OF PLURAL CONNECTED PARTS

PRIORITY CLAIM

This application is based on and claims the priority under 35 U.S.C. §119 of German Patent Application 103 35 483.2, filed on Aug. 2, 2003, the entire disclosure of which is incorporated herein by reference.

FIELD OF THE INVENTION

The invention relates to a hollow structural component made of plural connected parts, for example preferably a structural component of an aircraft.

BACKGROUND INFORMATION

In the field of aeronautic and aerospace technology, for example for the construction of aircraft, hollow structural components are used because they offer a high strength-to-weight ratio. Typically, such a hollow structural component is at least partially stiffened or strengthened with a honeycomb core material, for example. The fabrication and the further processing of such hollow structural components with honeycomb cores, are, however, very complicated technologically and very costly in terms of time and money. It is a further disadvantage that such a honeycomb core stiffening or strengthening the hollow structural component can be irreparably damaged or weakened through the fatiguing influence of continuous vibrations or corrosion over time during the operating life of the aircraft or the like. Thus, the strengthening or stiffening function provided by the honeycomb core can be diminished or even essentially negated over time.

Typically in this field, various assemblies or component groups are fabricated by riveting together individual parts. Disadvantageously, this manner of connecting the individual parts by rivets leads to a very great effort and cost of the assembly process and also leads to a substantial increase in the total weight of the assembled component due to the many individual fastening elements (e.g. rivets), surfacially applied sealant materials, and planar overlapping regions of material sheets to form the overlapped riveted joints.

SUMMARY OF THE INVENTION

In view of the above it is an object of the invention to provide a hollow structural component suitable for fabricating aircraft structures, assembled from plural parts that are nested or "plugged" together and mechanically securely connected to one another in a simple manner. It is another object of the invention to avoid the need for separate individual fasteners such as rivets, as well as sealant materials and overlapping joints. The invention further aims to avoid or overcome the disadvantages of the prior art, and to achieve additional advantageous, as apparent from the present specification. Attaining these objects is, however, not a required limitation of the claimed invention.

The above objects have been achieved according to the invention in a hollow structural component that is especially suitable as a structural component of an aircraft (e.g. for fabricating wing sections, tail unit sections, fuselage sections, internal components, etc.). The structural component comprises a rib framework including at least one first rib and at least one second rib, as well as top and bottom cover sheets and front and rear end closure sheets connected to and closing respective sides or ends of the rib framework.

The first and second ribs cross and intersect each other in a grid pattern, preferably at an angle in a range from 60° to 90° or more preferably at least 75° or most preferably at a perpendicular angle. The first rib and the second rib are respectively connected to each other, preferably by being "plugged" together to form the rib framework. The at least one first rib is preferably at least one transverse rib extending in the direction of the smaller plan dimension of the structural component, while the at least one second rib is preferably at least one longitudinal rib extending in the longitudinal direction of the larger plan dimension of the structural component.

Further according to the invention, two opposite edges of the first rib have tongue-shaped connector elements or connector tabs protruding outwardly therefrom. The top and bottom cover sheets have slots therein that receive the connector tabs protruding from the opposite edges of the first rib. In other words, the connector tabs of the first rib are inserted or plugged into the allocated slots of the top and bottom cover sheets. The front and rear end closure sheets are arranged at the ends of the hollow structural component intersected by the first rib(s), e.g. the transverse rib(s). Thus, for example, these end closure sheets extend parallel to the second or longitudinal rib(s).

For connecting together the first and second ribs, e.g. the transverse and longitudinal ribs, to form the rib framework, each of the ribs is preferably provided with corresponding slots to receive the respective intersecting ribs that are to be joined thereto. In other words, the transverse ribs are inserted or fitted into the slots of the longitudinal ribs, while the longitudinal ribs are simultaneously inserted or fitted into the slots of the transverse ribs. The slots thus enable the interengaging or intermeshing of the longitudinal and transverse ribs with each other along respective intersection lines defined by the slots. In this manner, the transverse ribs and the longitudinal ribs may be easily "plugged" together to form the grid pattern of the rib framework.

In addition to the first or transverse rib having connector tabs as mentioned above, the opposite top and bottom edges of the second or longitudinal rib may also be provided with similar connector tabs that are inserted to further slots provided in the top and bottom cover sheets.

To connect the top and bottom cover sheet to the ribs, the slots provided in the cover sheets have a tight-fit tolerance with respect to the connector tabs of the ribs. In other words, the connector tabs of the ribs are tightly fittingly inserted into the slots of the cover sheets. Furthermore, the height of the connector tabs protruding from the edge of the rib body of the rib matches or corresponds to the material thickness of the cover sheet with which they will be connected. Thereby, the connector tabs inserted into the slots of the cover sheet will terminate flush with the outer surface of the cover sheet. Each cover sheet may have essentially any technically required dimension, e.g. length and width as well as thickness, and may even be dimensioned as a one-piece cover sheet spanning and covering one side of all of the ribs of the rib framework of the entire structural component.

The end closure sheets can be connected to the rib framework in a generally similar manner as the cover sheets. Namely, the ends of the at least one first or transverse rib are provided with protruding connector tabs, which are inserted and engaged in corresponding allocated slots provided in the end closure sheets.

The various connector tabs can have various configurations to achieve the desired connection characteristics. For example, in the simplest embodiment, the connector tabs are simply substantially rectangular protrusions of the same material sheet or plate forming the body of the respective rib.

In other words, the connector tab has a continuous uniform thickness corresponding to the thickness of the rib. The edges of the connector tab may be tapered or chamfered to facilitate the insertion of the connector tab into the fitting slot of the cover sheet or end closure sheet. Moreover, the connector tab may have a configuration that snap-locks or fittingly engages into a mating configuration of the slot provided in the cover sheet or end closure sheet. For example, each connector tab may have a substantially cylindrical configuration that engages into a corresponding cylindrical slot of the cover sheet or the end closure sheet.

After the several parts are joined together by intermeshing the ribs and inserting the connector tabs of the ribs into the slots of the cover sheets and end closure sheets, the parts are respectively secured to one another by a permanent rigid mechanical connection. Particularly, for example, the at least one first rib is mechanically connected to the at least one second rib, the at least one first rib (or even all of the ribs) are mechanically connected to the top and bottom cover sheets, and the at least one first rib is mechanically connected to the end closure sheets, which are preferably also connected to the top and bottom cover sheets. The mechanical connections thereof can involve an adhesive bonded connection, a laser welded connection, a soldered connection, or a brazed connection, for example at each of the joints formed by a respective connector tab plugged into the associated slot, or the ribs inter-engaging each other's slots.

The several parts, i.e. the ribs, the cover sheets, and the end closure sheets, can be sheets or plates of a metal or of a fiber reinforced composite material, for example, or any other suitable material. These various parts may each have a flat planar configuration, or may be pre-curved or contoured in one or more dimensions if the resulting hollow structural component is to have a prescribed curve or a prescribed non-planar contour in one or more dimensions.

It is a significant advantage of the inventive hollow structural component, that it achieves an extremely low or light weight in combination with a high structural strength, i.e. a high strength-to-weight ratio. This is achieved, among other things, by completely avoiding the need for individual fasteners for connecting the parts to each other, sealant materials for sealing established joints, planar material overlap to form overlapping seams or joints, and angled or bent parts. Further advantages of the invention are seen in the greatly simplified configuration and form of the individual parts, the substantial avoidance of assembly aids such as special assembly jigs or the like due to the simplified assembly by merely plugging together the individual parts, as well as an automatable fabrication of the adhesive-bonded, soldered, brazed or welded connections due to the pre-established plugged-together self-stable interconnection of the several parts.

BRIEF DESCRIPTION OF THE DRAWINGS

In order that the invention may be clearly understood, it will now be described in connection with an example embodiment thereof, with reference to the accompanying drawings, wherein.

DETAILED DESCRIPTION OF A PREFERRED EXAMPLE EMBODIMENT AND OF THE BEST MODE OF THE INVENTION

Figure 1:
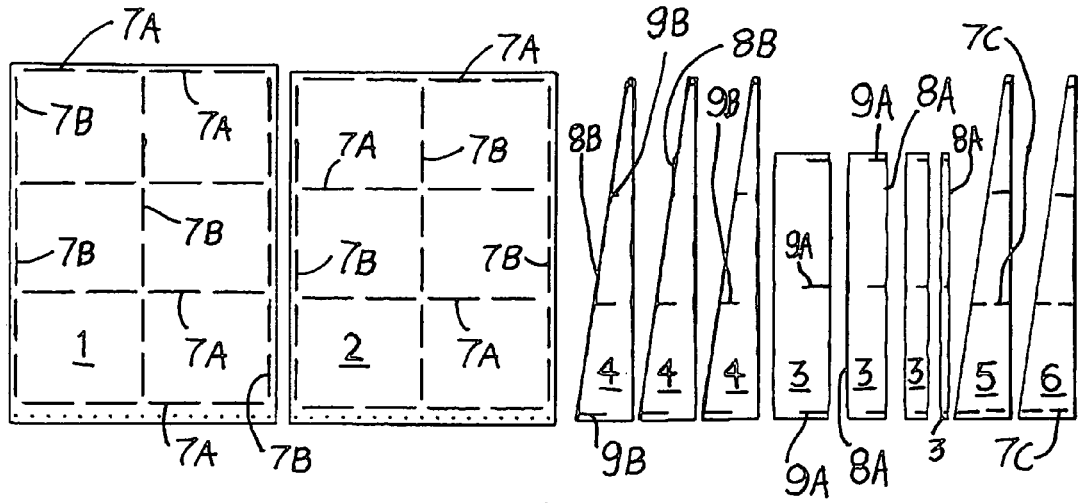
FIG. 1 shows the individual parts, not yet assembled, for fabricating an exemplary hollow structural component according to the invention.

FIG. 1 schematically shows a kit of individual parts that can be assembled to a form a hollow structural component according to a invention. The individual parts each have a simple planar configuration and each part may be simply stamped or otherwise cut out of a flat sheet or plate of material, such as a metal material or a fiber reinforced composite material. Thus, each part is essentially a flat sheet or plate having the respective plan configuration as shown.

More particularly, the parts shown in FIG. 1 include a top cover sheet 1, a bottom cover sheet 2, four transverse ribs 3, three longitudinal ribs 4, a front end closure sheet 5, and a rear end closure sheet 6. The number and configuration of parts shown in FIG. 1 is merely an example, but basically any number of the parts having essentially any configuration (either flat as in FIGS. 1, 2 and 3 or curved/contoured as in FIG. 4) can be assembled according to the invention to fabricate structural components having different configurations. Also, the size of each cover sheet 1 and 2 can be selected as needed for the technical requirements of the particular structural component, whereby a one-piece cover sheet can be used to cover one side of the entire structural component including several transverse ribs 3 and several longitudinal ribs 4. In this example, note that the top cover sheet 1 is slightly longer than the bottom cover sheet 2, because it covers the slightly longer inclined top edges of the longitudinal ribs 4, in comparison to the slightly shorter horizontal bottom edges of the longitudinal ribs 4 covered by the bottom cover sheet 2. Especially see FIG. 3, and also see FIG. 4. Further due to this configuration, the cover sheets 1 and 2 are spaced apart from one another with a spatially varying distance at least in a transverse direction of the hollow structural component. Also note that several of the inventive hollow structural components can then be joined together by conventional means, e.g. by riveting or welding, along a joint formed between edge rims of the respective cover sheets of adjoining ones of the components, which may be overlapped or butted together.

As will be described in further detail below, it is also apparent in FIG. 1 that each of the cover sheets 1 and 2 is provided with slots 7A and 7B to respectively receive connector tabs 8A provided on the edges of the transverse ribs 3 and connector tabs 8B provided on the edges of the longitudinal ribs 4. The grid pattern of slots 7A and 7B on the cover sheets 1 and 2 defines the grid configuration that will be taken on by the ribs 3 and 4. Thus, in the view orientation of FIG. 1, the longitudinal ribs 4 will extend in the upright or vertical direction (along the slots 7B) along the longer dimension of the cover sheets 1 and 2, while the transverse ribs 3 will extend in the crosswise or horizontal direction (along the slots 7A) along the shorter dimension of the cover sheets 1 and 2. These directions relating to the orientation of the view of FIG. 1 are not, however, a limitation on the orientation of the structural component and its parts in actual practice. Note in FIG. 1 that the slots 7A and 7B are non-intersecting at the locations at which their extensions would cross one another, i.e. the locations at which the ribs 3 and 4 cross one another.

Furthermore, the end closure sheets are provided with slots 7C adapted to receive connector tabs 8C provided at the ends of the transverse ribs 3.

Also, the transverse ribs 3 and the longitudinal ribs 4 have respective slots 9A and 9B by which the transverse ribs 3 and the longitudinal ribs 4 may be intermeshed and engaged with each other in a grid pattern to form a rib framework, as can be understood from the corresponding grid pattern of the slots 7A and 7B provided in the top and bottom cover sheets 1 and 2.

Figure 2:
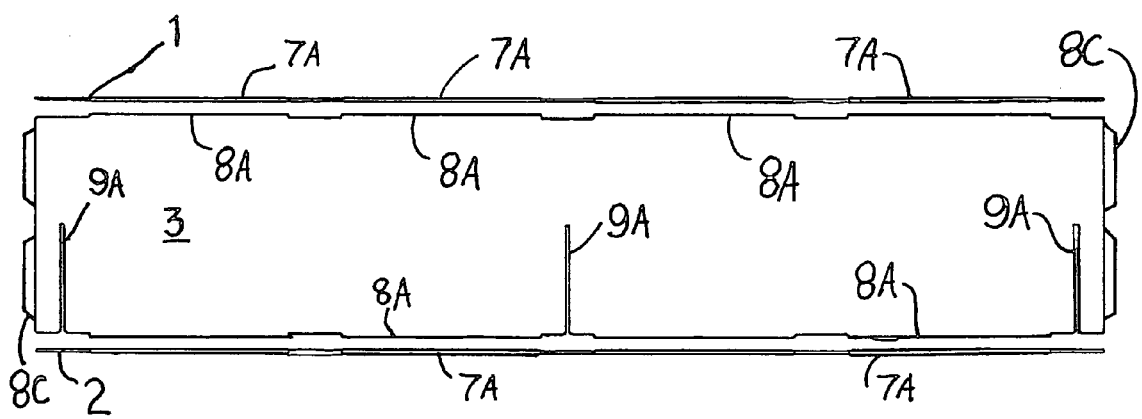
FIG. 2 is a schematic longitudinal elevation view of a single transverse rib and the adjoining cover sheets, in an exploded representation of the assembled condition, without the longitudinal ribs and the end closure sheets.
Figure 3:
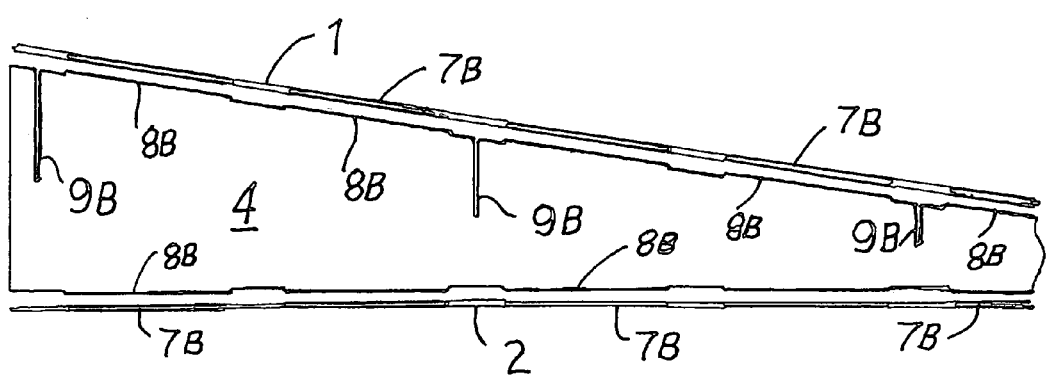
FIG. 3 is a schematic transverse elevation view of a broken portion of a single longitudinal rib and the adjoining cover sheets, in an exploded representation of the assembled condition, without the transverse ribs and the end closure sheets.
Figure 4:
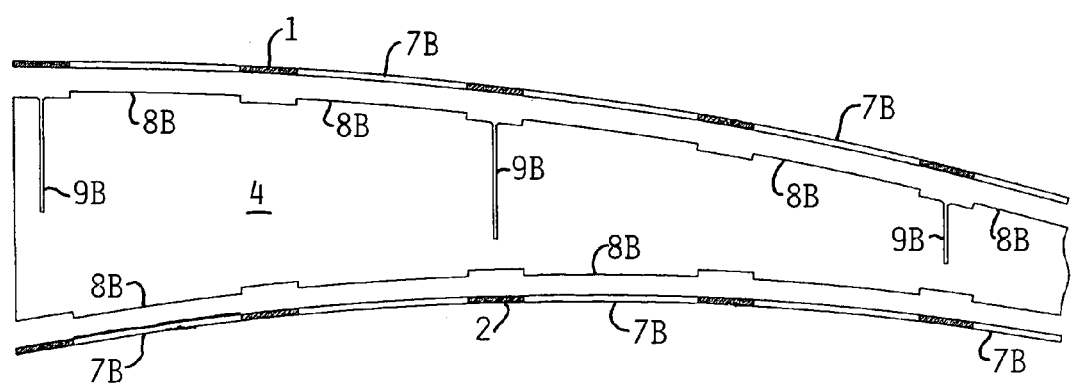
FIG. 4 is a view like FIG. 3, but showing an alternative embodiment with the cover sheets extending along curved contours rather than flat planes.

FIG. 2 is an elevation view in the longitudinal direction of a transverse rib 3 that is arranged between the top cover sheet 1 and the bottom cover sheet 2, and is about to be assembled with the cover sheets (or the illustration can be regarded as an exploded view of the assembled condition). The cover sheets are shown in section, and the longitudinal ribs and the end closure sheets have been omitted. In a similar manner, FIG. 3 is an elevation view in the transverse direction, showing a longitudinal rib 4 arranged between and about to be assembled with the top cover sheet 1 and the bottom cover sheet 2, while the transverse ribs and the end closure sheets have been omitted.

To assemble the rib framework, the three longitudinal ribs 4 are arranged parallel and spaced apart from one another, and the four transverse ribs 3 are arranged parallel and spaced apart from one another and substantially perpendicular to the longitudinal ribs 4. The transverse ribs 3 are pushed down and intermeshed with the longitudinal ribs 4 in the required grid pattern. For this purpose, each transverse rib 3 is provided with three slots 9A extending from the bottom edge of the rib 3 to about half way through the height of the rib 3, while each longitudinal rib 4 is provided with four slots 9B extending from the top edge of the rib 4 to about half way through the height of the rib 4. Note that only three of the slots 9B are visible in the portion of the rib 4 shown in FIG. 3. The width of each slot 9A corresponds to the thickness of each respective longitudinal rib 4 and the width of each slot 9B corresponds to the thickness of each respective transverse rib 3. In the grid pattern, each slot 9A of a transverse rib 3 is aligned to a respective slot 9B of a longitudinal rib 4, along an intersection line at which these two ribs will intersect each other. When the transverse ribs 3 are pushed or "plugged" into and engaged with the longitudinal ribs 4, the slots 9A thus receive the ribs 4 passing therethrough, while the slots 9B receive the ribs 3 passing therethrough.

The number of slots 9A in the transverse ribs 3 corresponds to the number of longitudinal ribs 4, while the number of slots 9B in the longitudinal ribs 4 corresponds to the number of transverse ribs 3. At each joint location, the total of the length of the slot 9A and the slot 9B corresponds to the height of the transverse rib 3 and also corresponds to the height of the longitudinal rib 4 at that location, so that the top edges of all of the ribs will lie flush on one plane and the bottom edges of all of the ribs will lie flush on one plane in the embodiment of FIGS. 2 and 3, or the top edges will lie flush on one curved contour and the bottom edges will lie flush on another curved contour in the embodiment of FIG. 4. As in this example, the length of each slot by itself can be half of this height.

Once the ribs 3 and 4 have been assembled in the grid pattern, the intersection joints of the ribs 3 and 4 are quite secure and self-stable due to the tight fit, but will still be removable. These joints may be permanently rigidly mechanically connected by welding, brazing, soldering, or adhesive bonding by means of automated equipment along each joint.

Then the rib framework of the ribs 3 and 4 may be assembled and connected to the top and bottom cover sheets 1 and 2 as follows. Alternatively, the bottom cover sheet 2 could have been used from the beginning as an assembly platform, by "plugging" the ribs 3 and 4 into the bottom cover sheet 2 to assemble the framework as described above. In any event, for connecting the cover sheets 1 and 2 to the ribs 3 and 4, the tongue-shaped connecting elements or connector tabs 8A protruding from the top and bottom edges of the rib body of each transverse rib 3 are inserted or plugged into the correspondingly dimensioned and located slots 7A in the top and bottom cover sheets 1 and 2, while the tongue-shaped connecting elements or connector tabs 8B protruding from the top and bottom edges of the body of each longitudinal rib 4 are inserted or plugged into the correspondingly dimensioned and located slots 7B in the top and bottom sheets 1 and 2.

The number, length, and location of the slots 7A and 7B can be selected as needed for the particular application, and must simply correspond to the number, dimension, and location of the connector tabs 8A, 8B provided on the ribs 3 and 4. Particularly, the slots 7A and 7B should have a size providing a tight press fit of the associated connector tabs 8A and 8B therein. In other words, the slot width of each slot should correspond to the thickness of the associated connector tab, e.g. the thickness of the respective rib. Also, the connector tabs 8A and 8B preferably have a protrusion height beyond the respective edge of the rib body of the rib 3 or 4 that corresponds to the thickness of the associated cover sheet 1 or 2, so that the outer edge of the connector tab terminates flush with the outer surface of the cover sheet 1 or 2.

While the plugged together assembly of the cover sheets on the rib framework is self-stable and somewhat secure due to the tight fit of the connector tabs 8A and 8B into the slots 7A and 7B, these joints are then preferably permanently rigidly mechanically secured or connected by means of welding, brazing, soldering, adhesive bonding, or the like, in a similar manner as the joints of the rib framework described above.

Furthermore, the ends of the hollow structural component can be closed by front and rear end closure sheets 5 and 6. For this purpose, the ends of the transverse ribs 3 are provided with protruding connector tabs 8C and the end closure sheets 5 and 6 have corresponding or mating slots 7C to receive these connector tabs 8C. Similar mating pairs of connector tabs and slots or notches can additionally be provided on the edges of the cover sheets 1 or 2 and the end closure sheets 5 and 6. If necessary for the particularly application, additional end closure sheets can be provided at the ends of the structural component intersected by the longitudinal ribs 4. For this purpose, the ends of the ribs 4 could similarly be provided with connector tabs that plug into associated slots provided on the additional end closure sheets. Once again, these plug-in connections can be permanently rigidly mechanically secured or connected by welding, brazing, soldering, adhesive bonding or the like.

In order to achieve an even tighter plug-in connection, the connector tabs 8A, 8B and/or 8C can have a configuration that mates in a snap-fitting manner into a corresponding configuration of the associated slot 7A, 7B and/or 7C. For example, each connector tab can have a cylindrical configuration that snaps or plugs into an associated cylindrically configured slot. The cylinder axis of the cylindrical configuration of the connector tab can extend along the respective edge of the rib, or protrude perpendicularly from the edge of the rib, or extend transversely across the edge of the rib. Instead of a cylindrical configuration, the tabs and slots could have a reverse triangle configuration, as another example.

All of the permanent joining or connecting of the externally accessible plug-in joints, i.e. the joints at all of the slots 7A and 7B of the cover sheets 1 and 2 and at the slots 7C of the end closure sheets 5 and 6, can be carried out together in one operation rather than in separate or successive stages as described above. To simplify this operation, the pre-assembled structural component can be fixed or held in a fabrication jig or the like to ensure that the parts are held in the proper positions and thereafter the joints are adhesively bonded, welded, brazed, or soldered as described above.

Although the invention has been described with reference to specific example embodiments, it will be appreciated that it is intended to cover all modifications and equivalents within the scope of the appended claims. It should also be understood that the present disclosure includes all possible combinations of any individual features recited in any of the appended claims.

What is claimed is:

1. A hollow structural component having a prescribed curve or a prescribed non-planar contour in one or more dimensions, comprising:
   outer cover sheets including first and second cover sheets that are spaced apart from one another with a spatially varying distance at least in a transverse direction of the hollow structural component to form opposite outer surfaces of said hollow structural component, and that each have non-intersecting first and second cover sheet slots therein, wherein said cover sheets define said prescribed curve or said prescribed non-planar contour;
   a rib framework that is arranged between said first and second cover sheets and that comprises at least one first rib and at least one second rib intersecting and connected to said at least one first rib, wherein said first and second ribs respectively have first and second rib connector tabs provided on two opposite edges thereof, and said first and second rib connector tabs are respectively engaged in said first and second cover sheet slots of said first and second cover sheets;
   first and second end closure sheets that are arranged between said first and second cover sheets, and that are spaced apart from one another with said rib framework therebetween, and that are arranged at opposite ends of said at least one first rib; and
   mechanical connections securing together said at least one first rib, said at least one second rib, said first cover sheet, said second cover sheet, said first end closure sheet, and said second end closure sheet, wherein respective ones of said mechanical connections are permanent mechanical connections selected from the group consisting of a soldered joint, a brazed joint, a welded joint, and an adhesive bonded joint, and are provided along said rib connector tabs engaged in said cover sheet slots to secure together said cover sheets and said rib framework.

2. The hollow structural component according to claim 1, wherein said at least one first rib is at least one transverse rib extending in a transverse direction of a relatively smaller plan dimension of said structural component, and said at least one second rib is at least one longitudinal rib extending in a longitudinal direction of a relatively larger plan dimension of said structural component.

3. The hollow structural component according to claim 1, wherein said at least one first rib comprises plural mutually parallel and spaced-apart transverse ribs, and said at least one second rib comprises plural mutually parallel and spaced-apart longitudinal ribs.

4. The hollow structural component according to claim 1, wherein said at least one second rib is respectively connected to said at least one first rib by being intermeshed with said at least one first rib.

5. The hollow structural component according to claim 1, wherein said first rib has a first rib slot therein, said second rib has a second rib slot therein, said first rib slot is aligned with said second rib slot along an intersection line, said second rib is pushed into and extends through said first rib slot along said intersection line, and said first rib is pushed into and extends through said second rib slot along said intersection line.

6. The hollow structural component according to claim 5, wherein one of said mechanical connections selected from the group consisting of a soldered joint, a brazed joint, a laser welded joint, and an adhesive bonded joint is provided along said intersection line to secure together said first and second ribs.

7. The hollow structural component according to claim 1,
   wherein said first rib comprises a rib body having said opposite edges, and said first rib connector tabs that protrude from said opposite edges away from said rib body; and
   wherein said first rib connector tabs respectively have a protrusion height protruding from said opposite edges that corresponds to a respective thickness of said first and second cover sheets.

8. The hollow structural component according to claim 1, wherein said first cover sheet slots are respectively dimensioned so that said first rib connector tabs are engaged with a tight press fit in said first cover sheet slots.

9. The hollow structural component according to claim 8, wherein said first cover sheet slots respectively have a slot width that corresponds to a respective thickness of said first rib connector tabs to provide said tight press fit of said first rib connector tabs in said first cover sheet slots.

10. The hollow structural component according to claim 1, wherein each said cover sheet is a one-piece cover sheet dimensioned to cover an entirety of one major surface of said rib framework.

11. The hollow structural component according to claim 1, wherein said end closure sheets each have end closure sheet slots therein, and said at least one first rib further includes end connector tabs that protrude from said opposite ends of said at least one first rib and are engaged in said end closure sheet slots.

12. The hollow structural component according to claim 11, wherein respective, ones of said mechanical connections selected from the group consisting of a soldered joint, a brazed joint, a laser welded joint, and an adhesive bonded joint are provided along said end connector tabs engaged in said end closure sheet slots to secure together said end closure sheets and said at least one first rib.

13. The hollow structural component according to claim 1, wherein said mechanical connections are permanent rigid mechanical connections.

14. The hollow structural component according to claim 1, wherein said mechanical connections are adhesive bonded connections.

15. The hollow structural component according to claim 1, wherein said mechanical connections are laser-welded connections.

16. The hollow structural component according to claim 1, wherein said mechanical connections are soldered connections.

17. The hollow structural component according to claim 1, excluding all discrete fasteners.

18. The hollow structural component according to claim 1, excluding all sealant materials.

19. The hollow structural component according to claim 1, excluding planar overlapped joints.

20. The hollow structural component according to claim 1, excluding all angled, bent or folded parts, and wherein said first and second ribs and said end closure sheets each respectively consist of a respective flat planar part cut from a flat planar plate or sheet without folding, bending or angling, and said cover sheets are out from a flat planar plate or sheet and are then curved to have said prescribed curve or said prescribed non-planar contour without folding, bending or angling.

21. The hollow structural component according to claim 20, wherein said first and second cover sheets respectively extend along respective curved contours defining said prescribed curve or said prescribed non-planar contour, and wherein said first and second rib connector tabs and said opposite edges of said first and second ribs respectively extend along said curved contours.

22. The hollow structural component according to claim 1, wherein said first and second ribs, and said first and second end closure sheets are each respective flat planar parts that each respectively have a uniform thickness.

23. The hollow structural component according to claim 22, wherein said first and second cover a sheets respectively extend along respective curved contours defining said prescribed curve or said prescribed non-planar contour, and wherein said first and second rib connector tabs and said opposite edges of said first and second ribs respectively extend along said curved contours.

24. The hollow structural component according to claim 1, wherein said first and second cover sheets, said first and second ribs, and said first and second end closure sheets each respectively consist of metal.

25. The hollow structural component according to claim 1, wherein said first and second cover sheets respectively extend along respective curved contours defining said prescribed curve or said prescribed non-planar contour, and wherein said first and second rib connector tabs and said opposite edges of said first and second ribs respectively extend along said curved contours.

26. A hollow structural component having a prescribed curve or a prescribed non-planar contour in one or more dimensions, comprising:
  two cover sheets that define said prescribed curve or said prescribed non-planar contour, and that are spaced apart from one another with a spatially varying distance at least in a transverse direction of said hollow structural component, and that each have non-intersecting first and second cover sheet slots therein;
  longitudinal ribs that are arranged parallel and spaced apart from one another between said two cover sheets and that each have longitudinal rib slots therein and first connector tabs protruding from opposite edges thereof, wherein said first connector tabs are engaged in said first cover sheet slots of said two cover sheets;
  transverse ribs that are arranged parallel and spaced apart from one another between said two cover sheets and that each have transverse rib slots therein and second connector tabs protruding from opposite edges thereof, wherein said second connector tabs are engaged in said second cover sheet slots of said two cover sheets, said transverse ribs extend transversely relative to said longitudinal ribs and intersect said longitudinal ribs at respective intersection lines on which respective ones of said longitudinal rib slots and said transverse rib slots lie, said transverse ribs are received in and extend through said longitudinal rib slots at said intersection lines, and said longitudinal ribs are received in and extend through said transverse rib slots at said intersection lines; and
  permanent rigid mechanical connections selected from the group consisting of adhesive bonded joints, soldered joints, brazed joints and welded joints provided along said first and second connector tabs engaged in said first and second cover sheet slots respectively.

* * * * *

UNITED STATES PATENT AND TRADEMARK OFFICE
CERTIFICATE OF CORRECTION

PATENT NO. : 7,661,242 B2  Page 1 of 1
APPLICATION NO. : 10/910259
DATED : February 16, 2010
INVENTOR(S) : Doersing et al.

It is certified that error appears in the above-identified patent and that said Letters Patent is hereby corrected as shown below:

Title page,
Item [*], Notice,
Line 3, replace "884" to --1485--;

Column 8,
Line 48, after "respective", delete ",";

Column 9,
Line 10, after "sheets are", replace "out" to --cut--.

Signed and Sealed this

Fifteenth Day of June, 2010

David J. Kappos
*Director of the United States Patent and Trademark Office*

UNITED STATES PATENT AND TRADEMARK OFFICE
CERTIFICATE OF CORRECTION

PATENT NO. : 7,661,242 B2 Page 1 of 1
APPLICATION NO. : 10/910259
DATED : February 16, 2010
INVENTOR(S) : Doersing et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1486 days.

Signed and Sealed this

Thirtieth Day of November, 2010

David J. Kappos
*Director of the United States Patent and Trademark Office*